Nov. 3, 1953 W. J. GRUNWALD 2,658,164
FOCUS CIRCUIT FOR CATHODE-RAY TUBES
Filed Nov. 3, 1950
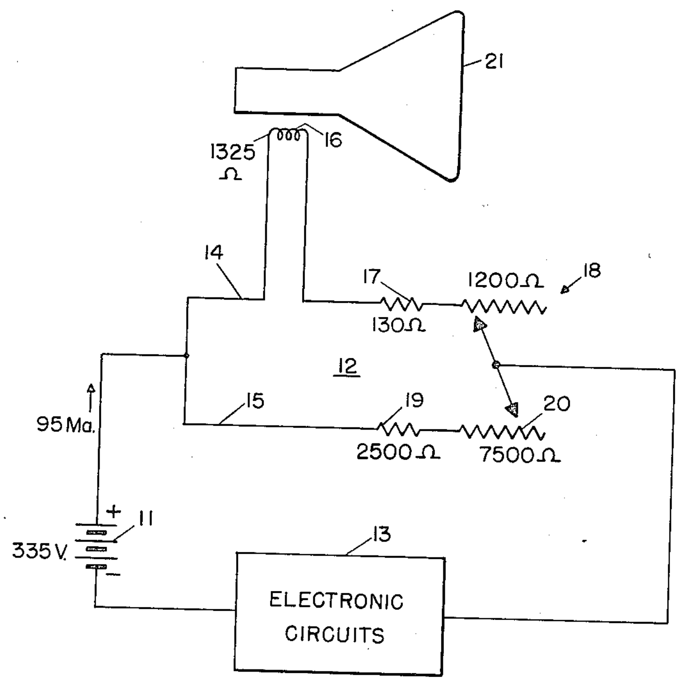
INVENTOR.
Werner J. Grunwald
BY Darby & Darby
ATTORNEYS Patented Nov. 3, 1953 2,658,164

UNITED STATES PATENT OFFICE 2,658,164

FOCUS CIRCUIT FOR CATHODE-RAY TUBES

Werner J. Grunwald, Maywood, N. J., assignor to Allen B. Du Mont Laboratories, Inc., Clifton, N. J., a corporation of Delaware Application November 3, 1950, Serial No. 193,819

10 Claims. (Cl. 315—31)

This invention relates to a focusing means for cathode ray tubes, and more particularly to means for adjusting the focus coil current of magnetically focused cathode ray tubes.

Magnetic focus coils are frequently utilized to achieve focusing of electron beams in cathode ray tubes in various devices such as television receivers, oscilloscopes, and the like. The magnetic focus coils must be provided with a voltage source or supply of direct current. It is common practice to connect the source of voltage in series with the magnetic focus coil, this source of voltage being commonly known as the "B" supply.

The "B" supply current, after flowing through the focus circuits, is usually applied to various associated electronic circuits such as amplifiers, oscillators, and the like.

A variable resistance is usually employed in conjunction with the focus coil circuit, for the purpose of adjusting the amount of focus coil current to achieve optimum focus and, in conventional focus circuits, an adjustment of said variable resistance causes a change in the total resistance of the focus circuit which causes a change in value at the "B" voltage. Such a change in the "B" or operating voltage causes undesirable changes in operating conditions of the associated electronic circuits, such as oscillators or amplifiers.

An object of this invention is to provide a cathode ray focus circuit having a voltage drop which is maintained essentially constant irrespective of adjustments of focus coil current.

Another object is to provide a circuit which permits a wide range of focus-coil current adjustment at increased efficiency.

Other objects will be apparent from the accompanying description, claims and drawing, in which:

The single figure is a schematic diagram of a preferred embodiment of the invention.

A source 11 of D. C. voltage is connected to a series circuit comprising a focus circuit and other electronic circuits 13 associated in the apparatus. The focus circuit 12 comprises two parallel current paths, one path comprising a series connection of a focus coil 16, a fixed resistance 17, and a variable resistance 18; the other path comprising a series connection of a fixed resistance 19 and a variable resistance 20. The variable resistances 18 and 20 may have linear or tapered resistance elements, and are linked mechanically in any convenient manner so that one of said resistances increases in resistance values as the other decreases, and vice versa. For convenience, this may be referred to as a differential connection. The focus coil 16 is placed in the usual manner with respect to a cathode ray tube 21.

Each resistance in the focus circuit is designated a value in accordance with a preferred proportionment of resistance values. The ratio of the variable resistances 20 and 18 is about six to one. The respective series fixed resistances 19 and 17 serve to define and control the effects of varying the variable resistances 18 and 20. However, the invention is not limited to the particular values of resistance here disclosed; other values and proportions may be used within the scope thereof, as determined by known principles dependent on the associated circuits 13.

In operation, the focus coil current is increased by reducing the value of, and decreased by increasing the value of, the variable resistance 18. Corresponding with said changes in the variable resistance 18, the variable resistance 20 is made to change differentially as has been explained, so that the value of current in the shunt current path 15 varies oppositely to current changes in the focus coil current path 14. Because of the selected proportionment of the relative values of resistances in the focus circuit 12, the currents in the parallel paths 14 and 15 are made to vary oppositely at such a rate and in such a manner that the total resistance and hence the voltage drop across the focus circuit 12 remain essentially constant regardless of the focus coil current and adjustment of the variable resistances 18 and 20.

In the particular embodiment shown, it has been found that the focus coil current can be varied over a range of about 45 milliamperes to about 80 milliamperes with a corresponding focus circuit voltage drop change of about 15 percent. By way of comparison, a frequently used conventional focus control circuit is capable of varying the focus coil current over a range of about 55 milliamperes to about 75 milliamperes with a corresponding focus circuit voltage drop change of about 25 percent.

The invention thus accomplishes its objectives of procuring a more constant voltage drop in the focus circuit and a greater range of focus coil current adjustment, resulting in greater efficiency.

Although a specific embodiment has been shown and described, the true scope of the invention is defined in the following claims.

What is claimed is:

1. Apparatus of the type described comprising in series connection a focus coil for a cathode ray tube, a source of voltage, electronic circuits associated with said tube and a first variable resistor, and a second variable resistor connected directly in parallel with said coil and said first resistor.

2. The apparatus of claim 1 in which said variable resistors are mechanically linked to vary relatively inversely the values thereof.

3. Apparatus of the type described comprising a cathode ray tube, a focus coil therefor, an electronic circuit associated therewith, a source of voltage, and a pair of variable resistances, said source being connected in series with said circuit, said coil and one of said resistances, the second of said resistances being connected directly in parallel with said coil and said first resistance.

4. The apparatus of claim 3 in which said variable resistances are linked to vary simultaneously and relatively inversely the values thereof.

5. Apparatus of the type described comprising a cathode ray tube, a focus coil therefor, an electronic circuit associated therewith, a source of voltage and a pair of variable resistances said source being connected in series with said circuit, said coil and one of said resistances, the second of said resistances being connected directly in parallel with said source and said circuit.

6. The apparatus of claim 5 in which said variable resistances are linked to vary simultaneously and relatively inversely the values thereof.

7. Apparatus of the type described comprising a cathode ray tube, a focus coil therefor, and an electronic circuit associated therewith, a source of voltage connected to said coil and said circuit, a first variable resistance connected in series with said coil, and a second variable resistance connected directly in parallel with said circuit.

8. The apparatus of claim 7 in which said resistances are linked to vary relatively inversely the values thereof.

9. A magnetic focusing circuit for the electron beam of a cathode ray tube comprising in series connection a source of voltage and two parallel current paths, a first one of said paths comprising a focus coil and a first variable impedance, the other of said paths comprising a second variable impedance connected directly in parallel with said first current path.

10. An electronic apparatus comprising in combination a cathode ray tube, a magnetic focus coil therefore, and a series circuit comprising a source of direct current, electronic circuits, and a focus circuit, said focus circuit comprising two parallel branches, one of said branches having a first variable resistance and said focus coil, and the second of said branches having a second variable resistance, said first and second variable resistances being mechanically linked to vary relatively inversely the impedance thereof.

WERNER J. GRUNWALD.

References Cited in the file of this patent

UNITED STATES PATENTS

| Number | Name | Date |
|---|---|---|
| 2,161,316 | Rogowski et al. | June 6, 1939 |
| 2,255,485 | Dome | Sept. 9, 1941 |
| 2,314,409 | Knoop | Mar. 23, 1943 |